United States Patent [19]
Takeuchi et al.

[11] Patent Number: 5,895,702
[45] Date of Patent: Apr. 20, 1999

[54] CERAMIC MEMBER

[75] Inventors: Yukihisa Takeuchi, Nishikamo-gun; Tsutomu Nanataki, Toyoake; Hisanori Yamamoto, Nagoya; Takashi Oguchi, Okaya, all of Japan

[73] Assignee: NGK Insulators, Ltd., Japan

[21] Appl. No.: 08/891,057

[22] Filed: Jul. 10, 1997

[30] Foreign Application Priority Data

Jul. 16, 1996 [JP] Japan ................................. 8-185805

[51] Int. Cl.⁶ .................................. B32B 3/24; B41J 2/06
[52] U.S. Cl. ...................... 428/137; 428/138; 428/215; 428/688; 347/55; 347/76; 347/141
[58] Field of Search ................................... 428/137, 138, 428/215, 688; 347/55, 76, 141

[56] References Cited

U.S. PATENT DOCUMENTS

| | | | |
|---|---|---|---|
| 5,202,704 | 4/1993 | Iwao | 346/159 |
| 5,204,696 | 4/1993 | Schmidlin et al. | 346/155 |
| 5,512,793 | 4/1996 | Takeuchi et al. | 310/328 |
| 5,517,076 | 5/1996 | Takeuchi et al. | 310/358 |
| 5,552,814 | 9/1996 | Maeda et al. | 347/55 |
| 5,600,197 | 2/1997 | Takeuchi et al. | 310/328 |

FOREIGN PATENT DOCUMENTS

| | | |
|---|---|---|
| 0 606 767 A1 | 7/1994 | European Pat. Off. . |
| 0 701 112 A2 | 3/1996 | European Pat. Off. . |
| 0 744 388 A1 | 11/1996 | European Pat. Off. . |
| 0 744 389 A1 | 11/1996 | European Pat. Off. . |
| 0 701 112 A3 | 2/1997 | European Pat. Off. . |

OTHER PUBLICATIONS

Mr. M. Miura et al.–The 4th International Congress In Non–Impact Printing Technology, 1987 (p.77–p.80). (Development in the Air Assisted Electrostatic Inkjet Printer: M. Miura, Y. Itoh, T. Iwasawa, G. Oda, K. Akami, Y. Sekiguchi–Matsushita Research Institute Tokyo, Inc.).

*Primary Examiner*—William P. Watkins, III
*Attorney, Agent, or Firm*—Wall Marjama Bilinski & Burr

[57] ABSTRACT

A ceramic member includes a thin plate having a plurality of minute throughholes and a rigid plate supporting the thin plate. The area of the thin plate both ends of which are supported by the rigid plate has a part bent toward the rigid plate so that the line connecting the apexes of the bent part is a straight line, and minute throughholes are formed in the vicinity of the apexes of the bent part. Good adhesion between minute throughholes formed on the line connecting the apexes of the bent part and the drum and the like is obtained, and defective transfer can be prevented.

5 Claims, 5 Drawing Sheets

CERAMIC MEMBER

BACKGROUND OF THE INVENTION AND RELATED ART STATEMENT

The present invention relates to a ceramic member used in ion flow control heads, encoders, scales, and high-precision minute electric field shutters.

A ceramic member comprising a thin plate having a plurality of minute throughholes supported by a rigid plate has been used in location detecting devices or recording devices as the parts of ion flow control heads, encoders, scales, and high-precision minute electric field shutters.

In the applications mentioned above, the minute throughholes are used for detecting or recording locations by passing or not passing a gas, liquid, solid particles or light.

For example, when the ceramic member is used as the part of an ion flow control head, as shown in FIG. 3, an electrode 1 is provided on a surface, a dielectric drum 6 is installed on the side where a rigid plate 9 is present, and an ion source 5 is installed on the other side. As a result, the discharge of ions 2 through the minute throughholes 4 is inhibited by making the electrode 1 carry a charge of the same sign as the ions carry. By contrast, ions are allowed to discharge by making the electrode 1 carry a charge of the opposite sign from that the ions 2 carry.

In either use, it is preferred that the drum 3 or the dielectric drum 6 contacts tightly with the opening of the minute throughholes from the point of view of fluid discharge, fluid control, or transfer properties.

However, when conventional ceramic members are used in a high-precision electric field shutters and the like, the presence of a rigid plate 9 interferes with the access of a drum and the like to minute throughholes 4, preventing the drum and the like from contacting the opening. If the drum is made to contact with the opening from the thin plate side, the electrode wiring contacts with the drum causing the electrode to wear, and the electric field cannot be applied to ions effectively because the electrode is apart from the ion source.

Preferably the thickness of the thin plate 13 is small so that the resistance for passing particles is decreased and drum shape followability is improved. However, if the plate is made to thin, the strength of the thin plate 13 is reduced, the adhesion of the drum to the minute throughholes deteriorates due to the deformation of the thin plate 13 to the opposite direction when the drum is approached, or the thin plate 13 is broken when the drum is contacted.

Therefore, it is the object of the present invention to provide a ceramic member which is well adhered with the drum and the like, and does not break due to the contact with the drum and the like.

SUMMARY OF THE INVENTION

According to the present invention, there is provided a ceramic member comprising a thin plate having a plurality of minute throughholes and a rigid plate supporting the thin plate, wherein both ends of the thin plate are supported by the rigid plate having a part bent toward the rigid plate so that the line connecting the apexes of the bent part is a straight line, and the minute throughholes are formed in the vicinity of the apexes of the bent part.

In the above ceramic member, it is preferred that the thickness of the thin plate is 1 μm or more and 50 μm or less, and the thickness of the rigid plate is 50 μm or more, and the distance between the line connecting the both ends of the thin plate and the line connecting the apexes of the bent part is 3 μm or more and 10 times the thickness of the rigid plate or less.

In the above ceramic member, it is preferred that the surface roughness Ra in the vicinity of the apexes of the bent part is 1 μm or less, and that the curvature in the vicinity of the apexes of the bent part is smaller than the curvature of the other parts of the bent part.

The above ceramic member may have a rectangular window in the rigid plate, and the thin plate closes the window under the condition where its four sides are supported by the rigid plate, and the part of the thin plate connecting between the ends of the bent part of the thin plate and the edge of the window of the rigid plate is bent toward the rigid plate.

PREFERRED EMBODIMENTS OF THE INVENTION

Figure 1:
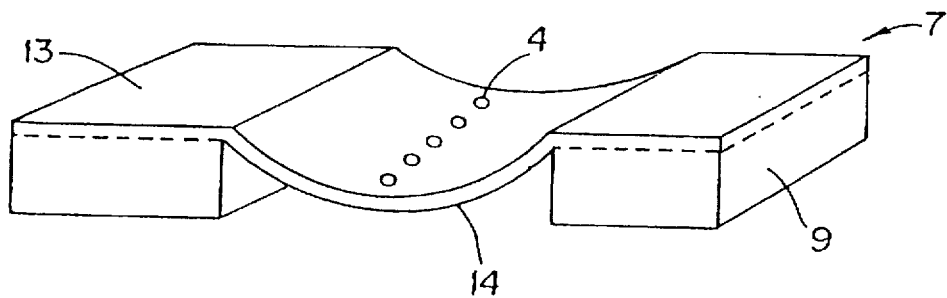
FIG. 1 is a perspective view illustrating an embodiment of the ceramic member according to the present invention.

In a ceramic member of the present invention, as FIG. 1 shows, both ends of a thin plate 13 are supported by a rigid plate 9 having a part 14 bent toward the rigid plate 9 so that the line connecting the apexes of the bent part 14 is a straight line. The minute throughholes 4 are formed in the vicinity of the apexes of the bent part 14.

Therefore, resilience and rigidity can be given to the thin plate 13, and even if the thickness of the thin plate 13 is decreased, the thin plate 13 follows the shape of the drum without escaping to the opposite direction when the drum is approached, thus enabling the drum to adhere with the openings of the minute throughholes 4. Damage of the thin plate 13 due to contact with the drum can also be prevented. This is because since deformation in the vicinity of the apex is small, and cracks do not develop from the minute throughholes. Furthermore, since the thin plate 13 protrudes against the drum, the presence of the rigid plate 9 does not interfere with the access of the drum to the minute throughholes 4.

The width of the thin plate supported by the rigid plate at the both ends is preferably 0.1–10 mm, and more preferably 2–5 mm from the point of view of rigidity, adhesion with the drum and followability to the shape of the drum.

In the ceramic member of the present invention, the thickness of the thin plate is preferably 1 µm or more and 50 µm or less, more preferably 5 µm or more and 40 µm or less. If the thickness is less than 1 µm, the mechanical strength of the thin plate decreases leading to damage. On the other hand, if the thickness exceeds 50 µm, rigidity increases but resilience cannot be given causing poor adhesion and high resistance for passing particles. Although the thin plate may be composed of a plurality of thin plates, its total thickness must meet the above requirements.

The thickness of the rigid plate is preferably 50 µm or more and 500 µm or less. If the thickness is less than 50 µm, the mechanical strength of the ceramic member decreases. However, if the thickness exceeds 500 µm, the member becomes difficult to install onto equipment. The rigid plate may not only increase the rigidity of the member, but have other functions.

Figure 5:
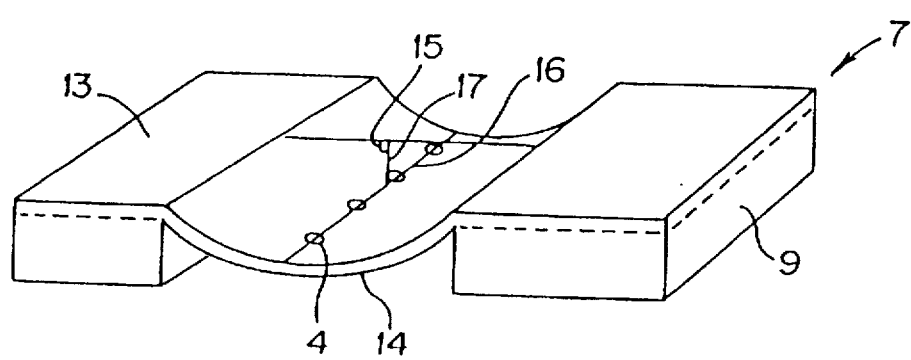
FIG. 5 is a diagram illustrating the concept of the amount of bending.

In the ceramic member of the present invention, the distance between the line connecting both ends of the thin plate supported by the rigid plate and the line connecting the apexes of the bent part (amount of bending) is preferably 3 µm or more and 10 times the thickness of the rigid plate or less. As FIG. 5 shows, "the distance between the line connecting the both ends of the thin plate 13 supported by the rigid plate 9 and the line 16 connecting the apexes of the bent part 14" means the length of a segment 17 drawn between and perpendicularly to lines 15 and 16. If the length of the segments are not uniform, the largest length is made the distance. If the amount of bending is less than 3 µm, then sufficient rigidity and resilience cannot be given to the thin plate. If the amount of bending exceeds 10 times the thickness of the rigid plate, then the curvature of the bent part becomes excessively large, and the rigidity and resilience of the thin plate become unsuitable. Moreover, and the electrode becomes difficult to form in the vicinity of the minute throughholes.

To improve adhesion from the point of view of rigidity and resilience it is preferred that the relationship between the thickness of the thin plate tu (µm), the amount of bending T (µm), and the width of the both end areas of the thin plate supported by the rigid plate W (µm) is that represented by the following equation.

$$0.0003 \mu m \leq [T(\mu m) \times tu(\mu m)]/W (\mu m) \leq 125 \mu m$$

Figure 2:
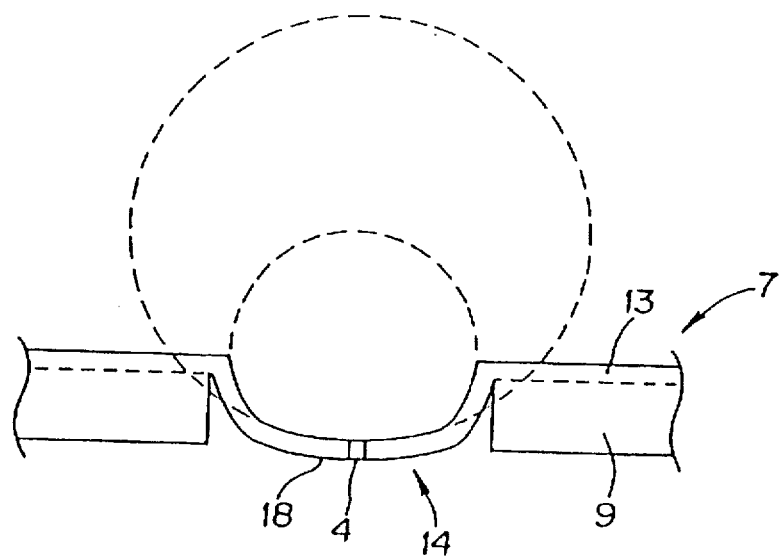
FIG. 2 is a diagram illustrating the concept of the curvature in the present invention.
Figure 3:
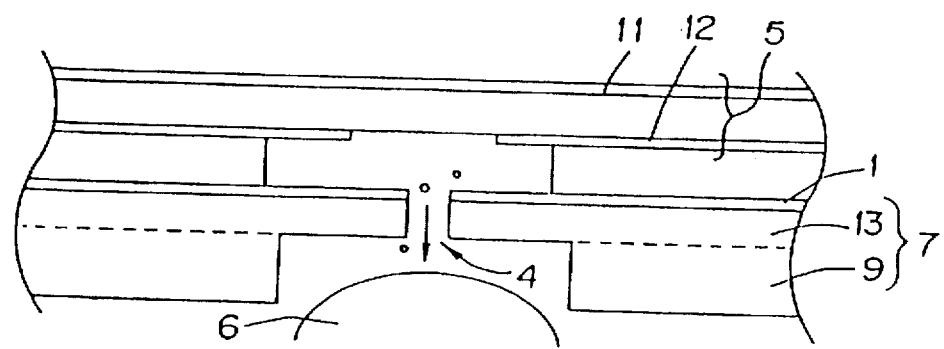
FIG. 3 is a sectional view illustrating an embodiment of an ion flow controlling head using a conventional ceramic member.
Figure 6:
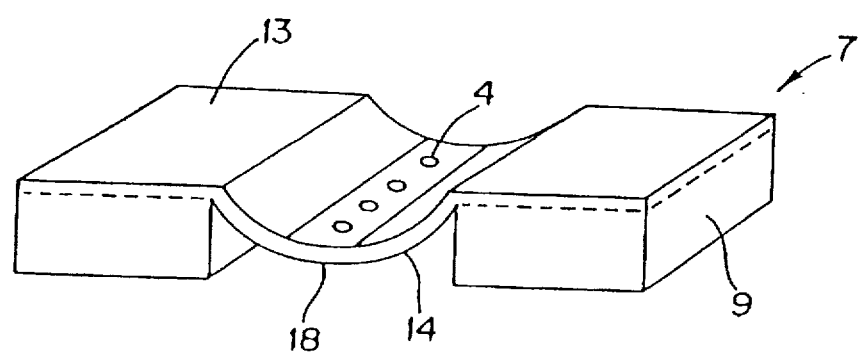
FIG. 6 is a perspective view illustrating another embodiment of the ceramic member according to the present invention.
Figure 7:
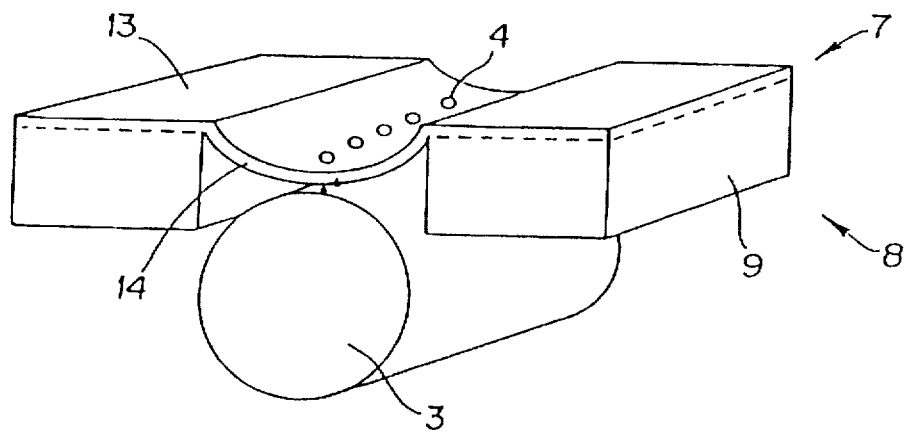
FIG. 7 is a sectional view illustrating an embodiment of the electric field shutter head using the ceramic member according to the present invention.
Figure 10:
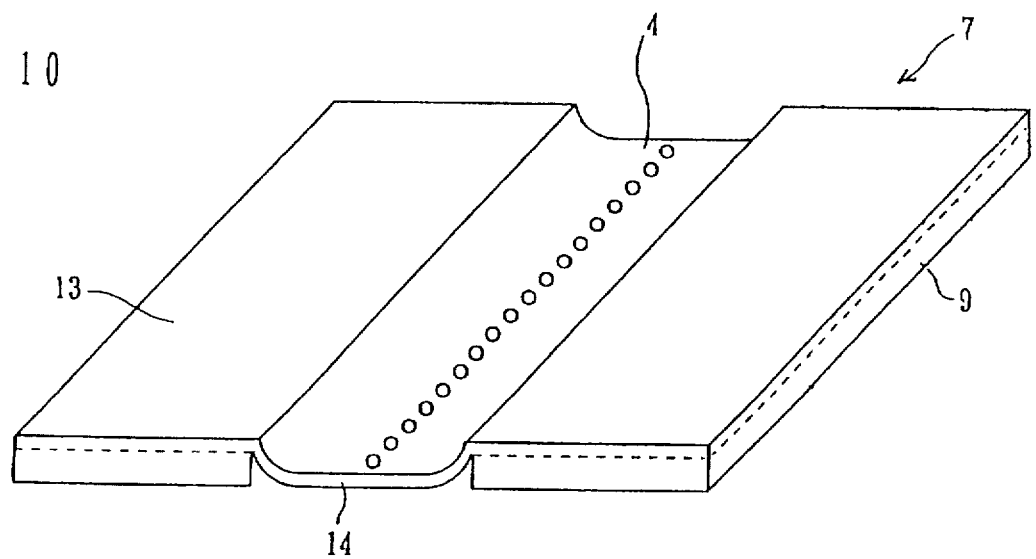
FIG. 10 is a perspective view illustrating further embodiment of the ceramic member according to the present invention.

In the ceramic member of the present invention, as FIG. 6 shows, the curvature of the bent part 14 in the vicinity of the apex 18 is preferably smaller than that of the bent part 14 in other parts. It is more concretely shown by a ceramic member in FIG. 10. If the curvature of the bent part 14 is increased, the rigidity and resilience of the thin plate 13 increase, but adhesion between the drum and the openings decreases significantly only by the small deviation of the location to provide minute throughholes 4 from the straight line connecting apexes of the bent part 14. Therefore, by decreasing the curvature in the vicinity of the straight line 18 connecting apexes of the bent part 14, and significant decrease in adhesion can be prevented even if the location where the minute throughholes 4 are formed is a little deviated. In addition, by maintaining large curvature of the other parts, the resilience and rigidity of the thin plate 13 can be kept high. The term of curvature used herein is the curvature of the most approximate circle when a circle, a part of which is the above other parts or the vicinity of the apex 18 of the bent part 14 , is considered as FIG. 2 shows.

The surface roughness Ra (average roughness at the center line), measured using a Surfcom (manufactured by Tokyo Seimitsu Co. Ltd.) with the radius of the probe of 5 µm under the conditions of the cutoff of 0.08 mm, is preferably 1 µm or less, and more preferably 0.2 µm or less. When the surface roughness Ra is within the above range, adhesion is further improved.

Figure 4:
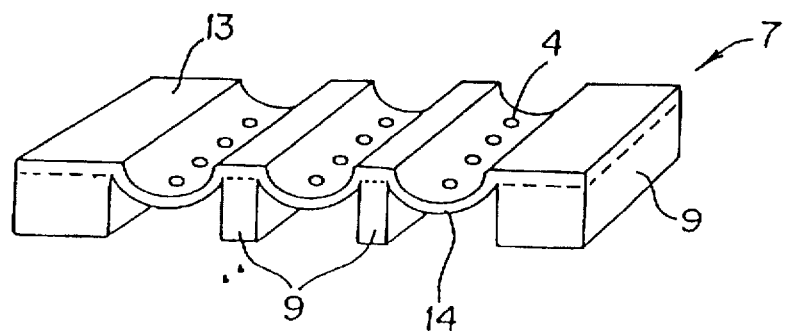
FIG. 4 is a perspective view illustrating another embodiment of the ceramic member according to the present invention.

As FIG. 4 shows, the ceramic member of the present invention may have more than one bent part 14. In this case, each bent part must meet the requirements of the amount of bending and the like.

Figure 9:
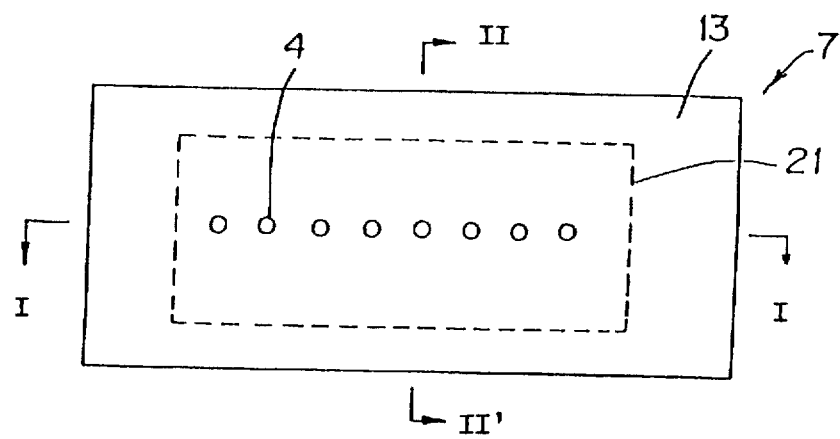
FIG. 9 (a) is a top view, FIG. 9 (b) is a sectional view along the line I—I', and FIG. 9 (c) is a sectional view along the line II—II', all illustrating another embodiment of the ceramic member according to the present invention.
Figure 9:
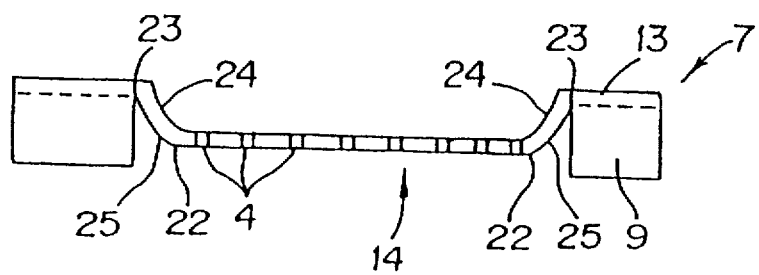
Figure 9:
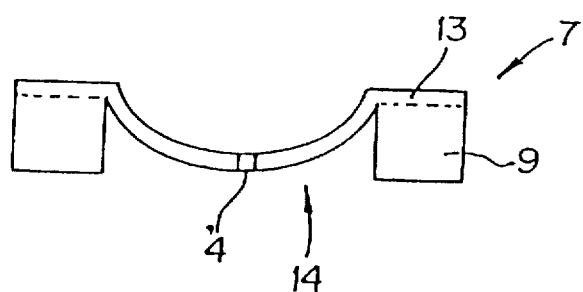

As FIG. 9 shows, the ceramic member of the present invention may have a rigid plate 9 having a rectangular window 21, and the thin plate 13 may be installed to close the window under the condition where four sides of the thin plate 13 are supported by the rigid plate 9, and the part 24 of the thin plate 13 connecting between the both ends 22 of the bent part 14 of the thin plate 13 and the edge 23 of the window 21 of the rigid plate 9 may have a bent part 25 to the direction of the rigid plate 9. By surrounding the circumference with the rigid plate, strength against the external force such as torsion can be increased. As a result, the damage of the thin plate can be prevented.

Although the materials of the ceramic member of the present invention are not limited to specific ones, and alumina, partially stabilized zirconia, completely stabilized zirconia, or the mixture thereof may be used. It is preferred, from the point of view of improving the strength and wear resistance of the ceramic member, and of giving adequate Young's modulus and deformability, that the ceramic member is based on partially stabilized zirconia containing 2–6 mole percent, preferably 2.5–4.0 mole percent of yttrium oxide, and the average grain diameter of its crystals is 2 µm or less, and preferably 1 µm or less.

Incidentally, the thin plate desirably has the same ceramic composition as the rigid plate thereby improving reliability. Moreover, the thin plate is fired simultaneously with the rigid plate, so as to obtain a unitary body, even further improving reliability.

In the ceramic member of the present invention, the shape of the openings of the minute through holes provided on the thin plate is not limited to a specific shape, but may be circular, oval, rectangular, polygonal, or the combination thereof. The throughhole diameter of the openings is preferably 150 µm or less, and preferably 100 µm or less. The term of throughhole diameter used herein is the diameter when the shape of the minute throughholes is circular, the length of the major axis when it is oval, the length of the longer side when it is rectangular, and the length of the longest diagonal line when it is polygonal.

Distance between the minute throughholes is preferably 150 µm or less, and more preferably 80 µm or less. The terms of distance between the minute throughholes used herein is the shortest distance between the edges of openings of adjacent minute throughholes.

The ceramic member of the present invention can be produced for example using the following method.

Ceramic green sheets for the thin plate and the rigid plate each having a desired thickness are formed using slurry or paste prepared by combining a suitable binder, plasticizer, dispersing agent, sintering additive, and organic solvent to ceramic powder, by a known method such as doctor blade, calendar, printing, and reverse roll coater methods.

The green sheets are then processed by cutting, machining, punching, and the formation of minute throughholes to fabricate formed articles having desired shapes and dimensions. The minute throughholes are formed by methods such as die/NC punching and excimer laser processing.

After the formed article for the thin plate and the formed article for the rigid plate are joined by heating and compressing and the like, the system is sintered at a temperature between about 1200 and 1700° C., preferably between about 1300 and 1600° C., and then the electrode is formed by screen printing, spattering, or photolithography. The bent part is formed by controlling the shrinkage of the thin plate and the rigid plate during sintering. Alternatively, the bent part can be formed by forming a bent configuration in the condition of a laminate before firing and then firing the laminate. Although it is preferred that no local protrusions are present from the point of view of adhesion, such protrusions may preferably be removed by etching, grinding, or machining.

Figure 8:
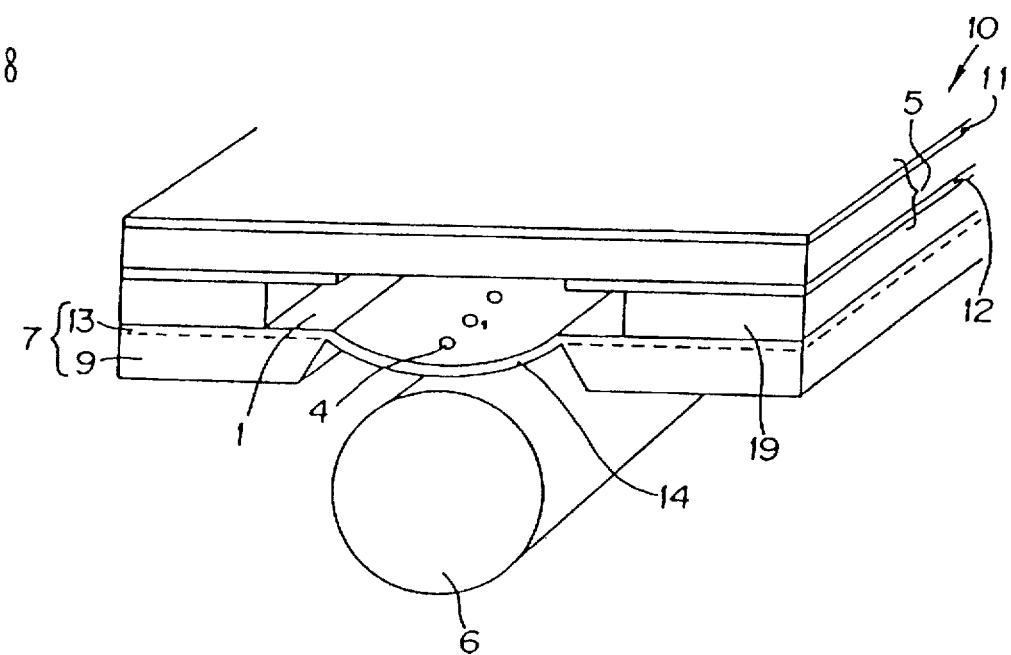
FIG. 8 is a perspective view illustrating an embodiment of the ion flow controlling head using the ceramic member according to the present invention.

FIG. 8 shows an embodiment of an ion flow controlling head using the ceramic member of the present invention. In the ion flow controlling head 10 shown in FIG. 8, an ion source 5 is provided through the ceramic substrate 19 on the side of the ceramic member 7 where the electrode 1 is installed, and a dielectric drum 6 is provided on the other side. The thin plate 13 is bent toward the rigid plate 9, and minute throughholes 4 are provided in the vicinity of the apex of the bent part 14.

Incidentally, a ceramic member of the present invention can be used for a filter, a screen, a filtering member, or the like, since it has the aforementioned constitution. Advantages of the use of a ceramic member of the present invention for a filter, a screen, or a filtering member are as follows:

1) A member of the present invention is excellent in abrasion resistance since it is made of ceramic.

2) Since a thin plate having minute throughholes has a very thin thickness of 1–50 μm, filtration resistance can be decreased.

3) It is rarely broken because the rigid plate supports the thin plate.

4) An efficiency of filter area can be increased because a density of openings (minute throughholes) can be increased.

Figure 11:
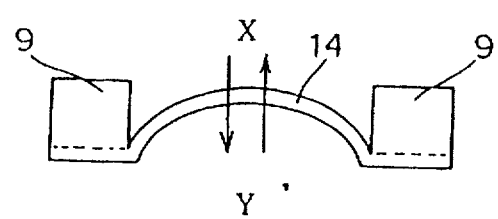
FIG. 11 is an explanatory view showing a direction of filtration in a bent part of a ceramic member.

5) Since a portion of a thin plate is adequately bent, a filtration pressure resistance or a reverse wash pressure resistance can be made high even if a filter portion is thin. That is, a direction toward which a particle to be filtered is passed can be both ones against the bent portion. Accordingly, as shown in FIG. 11, for example, when filtration is performed from the side X to the side Y, a filtration pressure resistance can be increased. On the other hand, when filtration is performed from the side Y to the side X, a reverse wash pressure resistance can be increased.

Although the present invention will be described in further detail based on a preferred example, the present invention is not limited to this example.

A ceramic member in which a thin plate is bent toward a rigid plate, and minute throughholes are formed in the vicinity of the apex of the bent part of the thin plate was fabricated, and an ion flow controlling head was produced using this ceramic member.

The thickness of the thin plate was 30 μm, and the thickness of the rigid plate was 80 μm. The width of the both end areas of the thin plate supported by the rigid plate was 3.2 mm. The throughhole diameter of the minute throughholes was 75 μm, and the distance between the minute throughholes 4 was 80 μm, and the amount of bending was 10 μm. The curvature in the vicinity of the straight line connecting the apexes of the bent part was smaller than that of the other areas of the bent part. The surface roughness, measured using a Surfcom (manufactured by Tokyo Seimitsu Co. Ltd.) with the radius of the probe of 5 μm under the conditions of the cutoff of 0.08 mm, was 0.1 μm. A partially stabilized zirconia-based ceramic was used as the material for the ceramic member.

The result of ion transfer to the dielectric drum performed using this ion flow controlling head showed that good adhesion was obtained between the dielectric drum and the openings of the minute throughholes, and that images having better transfer properties were obtained when compared with the case where the thin plate was not bent. Also, the thin plate was not damaged.

According to the ceramic member of the present invention, since the area of the thin plate both ends of which are supported by the rigid plate is bent toward the rigid plate, good adhesion between minute throughholes formed on the line connecting the apexes of the bent part and the drum and the like is obtained, and defective transfer can be prevented. Also, since adequate rigidity and resilience can be given to the thin plate, the thin plate is not damaged due to contact with the drum, rollers, and the like even if the thickness of the thin plate is decreased.

What is claimed is:

1. A ceramic member comprising a thin plate having a plurality of minute throughholes and a rigid plate supporting said thin plate, wherein said thin plate both ends of which are supported by said rigid plate has a part bent toward said rigid plate so that the line connecting the apexes of said bent part is a straight line, and said minute throughholes are formed in the vicinity of the apexes of said bent part.

2. A ceramic member as claimed in claim 1, wherein the thickness of said thin plate is 1 μm or more and 50 μm or less, and the thickness of said rigid plate is 50 μm or more, and the distance between the line connecting said both ends of said thin plate and the line connecting the apexes of said bent part is 3 μm or more and 10 times the thickness of said rigid plate or less.

3. A ceramic member as claimed in claim 1, wherein the curvature in the vicinity of the apexes of said bent part is smaller than the curvature of the other parts of said bent part.

4. A ceramic member as claimed in claim 1, wherein the surface roughness Ra in the vicinity of the apexes of said bent part is 1 μm or less.

5. A ceramic member as claimed in claim 1, wherein said rigid plate has a rectangular window, said thin plate closing said window under the condition where four sides thereof are supported by said rigid plate, and the part of said thin plate connecting between the both ends of the bent part of said thin plate and the edge of the window of said rigid plate is bent toward said rigid plate.

* * * * *